United States Patent [19]

Goldhammer et al.

[11] Patent Number: 5,275,358
[45] Date of Patent: Jan. 4, 1994

[54] WING/WINGLET CONFIGURATIONS AND METHODS FOR AIRCRAFT

[75] Inventors: Mark I. Goldhammer, Bellevue; Karel A. Schippers, Renton, both of Wash.

[73] Assignee: The Boeing Company, Seattle, Wash.

[21] Appl. No.: 739,615

[22] Filed: Aug. 2, 1991

[51] Int. Cl.$^5$ .............................. B64C 5/08
[52] U.S. Cl. ................................ 244/91; 244/199
[58] Field of Search .......... 244/91, 199, 198, 130, 244/15

[56] References Cited

U.S. PATENT DOCUMENTS

| | | | |
|---|---|---|---|
| 2,074,201 | 3/1937 | Bechereau | 244/91 |
| 3,845,918 | 11/1974 | White, Jr. | 244/41 |
| 4,017,041 | 4/1977 | Nelson | 244/91 |
| 4,190,219 | 2/1980 | Hackett | 244/199 |
| 4,205,810 | 6/1980 | Ishimitsu | 244/91 |
| 4,240,597 | 12/1980 | Ellis et al. | 244/35 R |
| 4,245,804 | 1/1981 | Ishimitsu et al. | 244/91 |
| 4,247,063 | 1/1981 | Jenkins | 244/91 |
| 4,714,215 | 12/1987 | Jupp et al. | 244/199 |

OTHER PUBLICATIONS

Design & Analysis of Winglets for Military Aircraft, Boeing Commercial Airplane Company Technical Report AFFDL-TR 76-6 by Ishimitsu et al Feb. 1976.

Primary Examiner—Michael S. Huppert
Assistant Examiner—Anne E. Bidwell
Attorney, Agent, or Firm—Hughes & Multer

[57] ABSTRACT

A wing/winglet configuration, which basically comprises: (a) a wing having upper and lower wing surfaces, a wing leading edge, a wing trailing edge, and a wing tip; and (b) a winglet having upper and lower winglet surfaces, a winglet leading edge, a winglet trailing edge, and a winglet tip, where the winglet is mounted to the wing tip at a winglet/wing tip intersection and extends upwardly from the wing tip Aft portions of the upper wing surface and upper winglet surface are flattened near the winglet/wing tip intersection to substantially reduce flow separation near wing/winglet intersection.

19 Claims, 7 Drawing Sheets

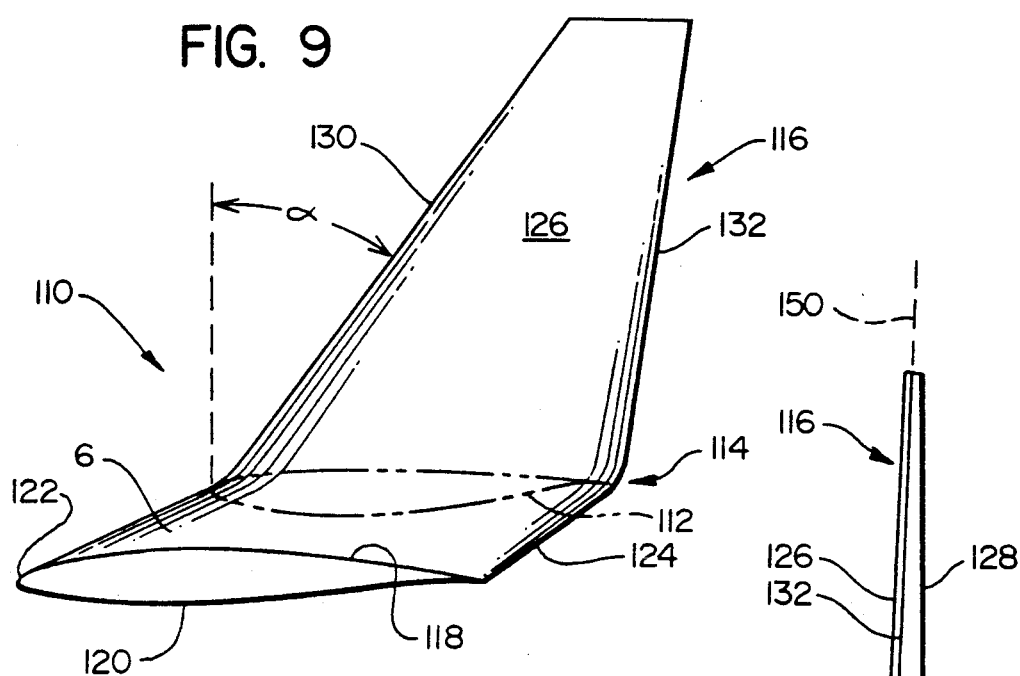
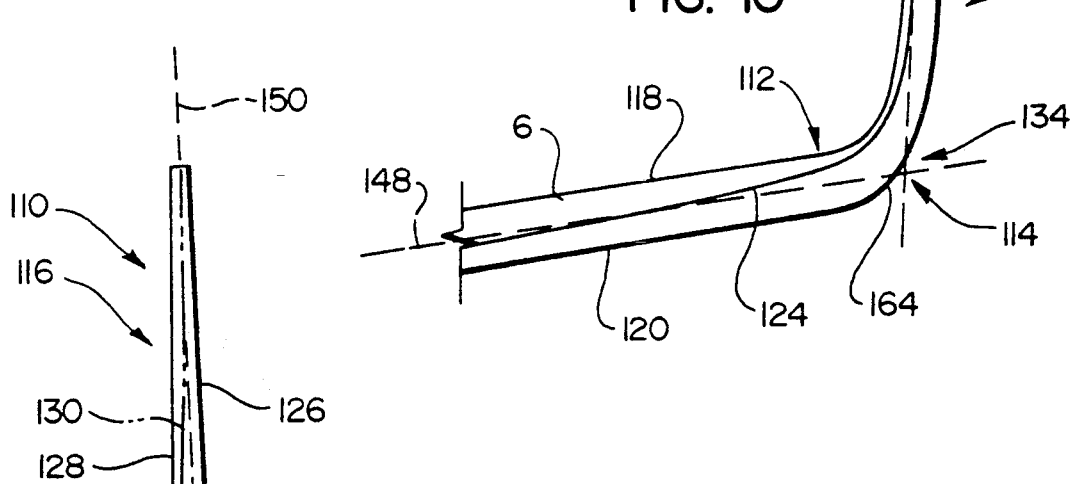
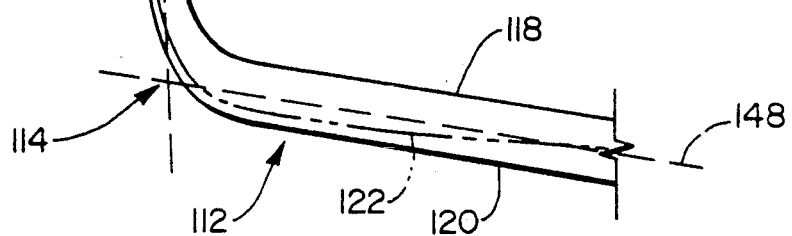

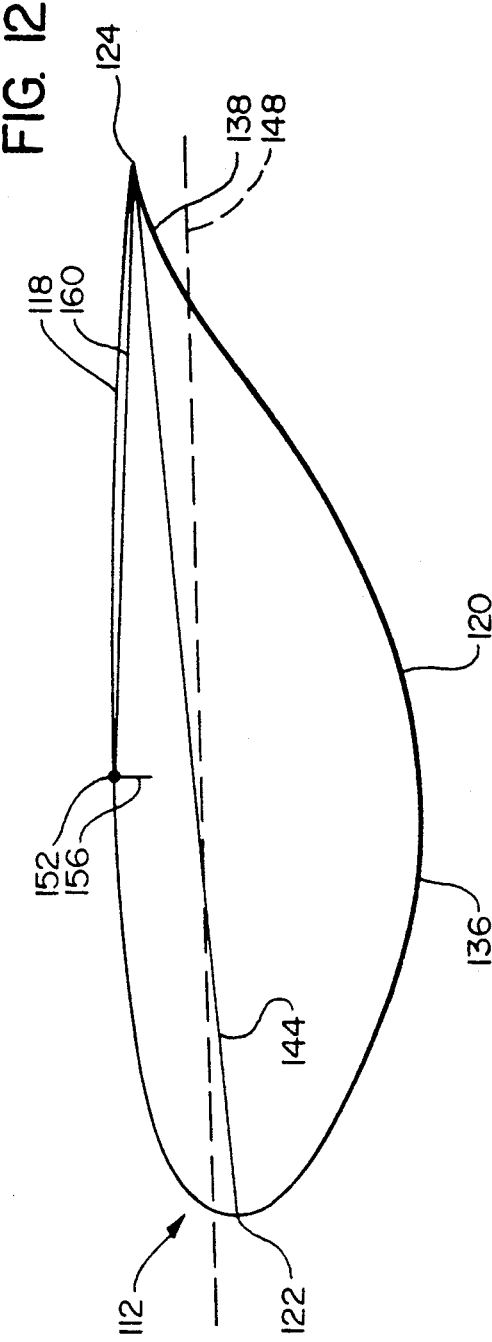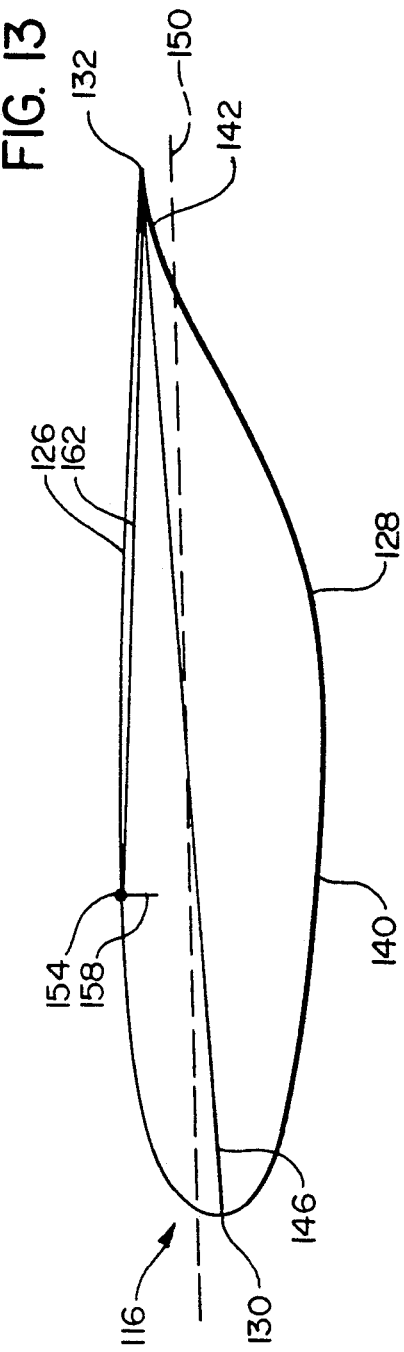

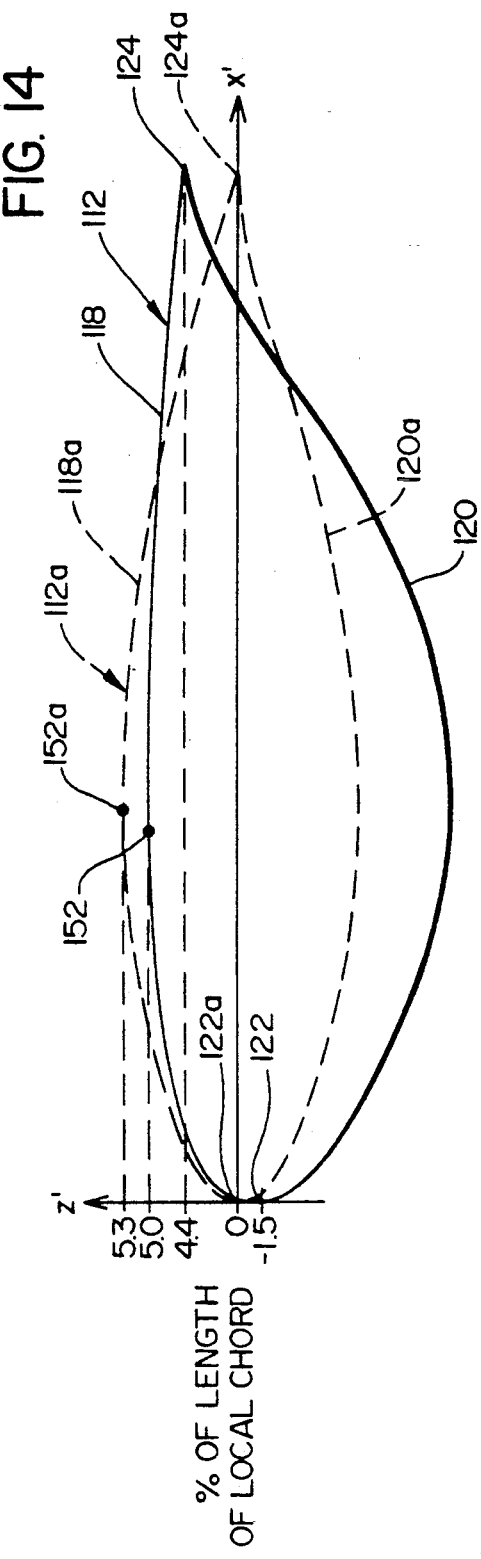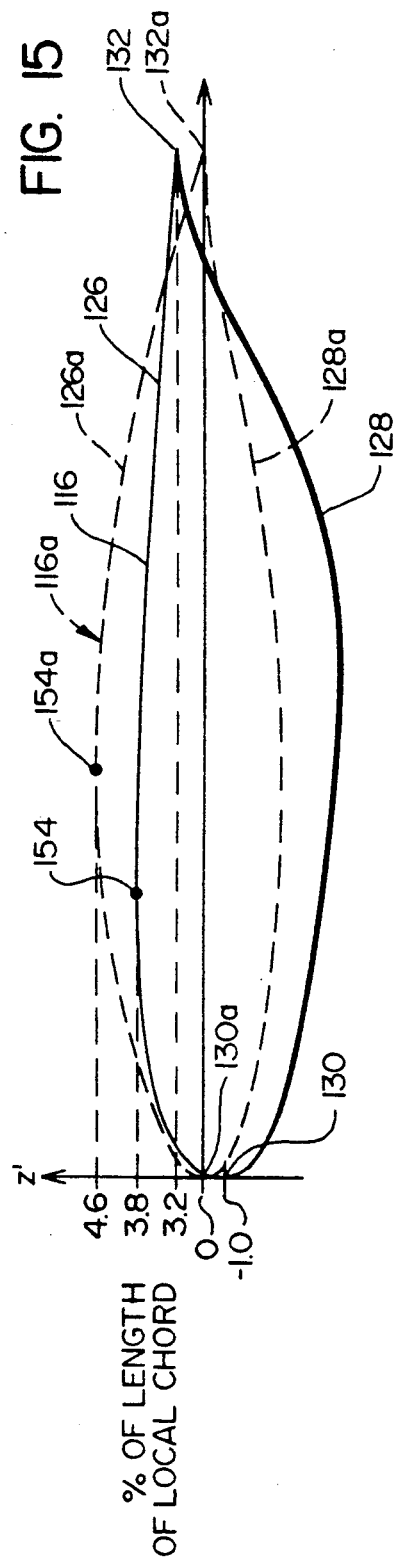

WING/WINGLET CONFIGURATIONS AND METHODS FOR AIRCRAFT

TECHNICAL FIELD

This invention relates to high efficiency aircraft lifting surfaces and, more particularly, to airfoils such as wings having winglets attached to the tips thereof to reduce overall drag.

BACKGROUND OF THE INVENTION

It has long been known that providing an endplate on the wing tip of an aircraft airfoil reduces induced drag at the wing tip. Induced drag is caused by the difference in fluid flow pressure on the upper and lower surfaces of the airfoil. At the wing tip, this pressure differential produces fluid-flow that is transverse to the stream of lift-producing fluid; that is, because the fluid pressure is higher below the wing than above, fluid flows from below the wing to above the wing around the wing tip in a direction transverse to that of the lift-producing fluid. The endplate on the wing tip impedes this transverse fluid flow and thus reduces the induced drag on the airfoil.

These endplates are relatively thin fins or shields that extend streamwise along the wing and project upwardly to impede transverse fluid flow along the top of the wing. Non-planar structures, such as tubular members with circular or elliptical cross-sections, have also been mounted on wing tips to reduce induced drag by impeding transverse fluid flow. The above-described endplates and other non-planar structures, while generally effective at reducing induced drag in low speed aircraft, were inappropriate for use with modern high speed aircraft because on high speed aircraft they tended to increase profile drag, interference drag, compressibility drag, flow separation at the wing tip/endplate intersection, and/or the bending moment at the root of the wing. Therefore, endplates and other non-planar structures have not been successfully employed on modern high speed aircraft.

For these and other reasons, designers began to apply the same aerodynamic principles that govern wing airfoil design to the design of endplates. Such aerodynamically efficient endplates will be referred to herein as winglets. These winglets are able to reduce induced drag while lowering profile drag, interference drag, compressibility drag, and/or the bending moment at the root of the wing. However, it is well-known that these winglets are still susceptible to flow separation at the wing/winglet intersection.

More particularly, the flow separation at the wing/winglet intersection is caused by interference between the fluid flowing over the upper surface of the wing and the fluid flowing over the upper surface of the winglet. The fluid streams flowing over these two upper surfaces diverge as they pass over the wing and winglet upper surfaces between the thickest portions and the trailing edges of the wing and winglet. These diverging streams of fluid will be discussed in more detail below with reference to FIGS. 3 and 4. Flow separation occurs in the areas on the upper surfaces between these divergent streams of fluid. This flow separation is particularly acute at low speed, high lifting conditions.

PRIOR ART

FIGS. 2-6 depict a conventional wing/winglet configuration as is generally known in the art. The main features of this configuration will be discussed below to the extent that they are relevant to the present invention.

Before discussing the prior art wing/winglet configuration depicted in FIGS. 2-6, however, it is first necessary to describe in general terms the aircraft on which any such wing/winglet configuration will be mounted. An example of such an aircraft is depicted in FIG. 1 and is generally indicated at reference character 2.

In the following description, the terms "fore, front" denote the direction towards the lower left of FIG. 1, the terms "aft, rear" denote the direction towards the upper right, the terms "left, port" denote the direction towards the lower right, and the terms "right, starboard" denote the direction towards the upper left. The terms "up, top" and "down, bottom" refer to the corresponding directions shown in FIG. 1. The terms "inner" and "outer" refer to directions closer to and farther from, respectively, the aircraft 2.

The aircraft 2 basically comprises an aircraft body 4, left and right wings 6, and a tail section 8. A prior art wing/winglet combination 10 may be mounted on the outer end of each wing 6.

A coordinate system is defined for the aircraft 2 in the following manner. A longitudinal axis x is defined to extend through the center of the aircraft body 4 in the fore and aft directions. Further, a vertical axis z is defined in the up and down directions, while a transverse axis y is defined in the left and right directions. The longitudinal axis x, vertical axis z, and transverse axis y are orthogonal to each other and meet at an origin located at the forwardmost point of the aircraft 2.

For each wing 6 of the aircraft 2, a wing reference plane is defined in the following manner. The wing reference planes are parallel to the longitudinal axis of the aircraft 2. Further, each wing reference plane generally extends at an angle upwardly to reflect the dihedral normally provided to the wing. In general, the wing reference plane upwardly extends at an angle of between 3° and 8° from the transverse axis y of the aircraft 2. Additionally, a winglet reference plane is defined for each winglet. The winglet reference plane is also parallel to the longitudinal axis of the aircraft.

The wing span of the aircraft 2 is defined as the distance between the outermost points on the left and right wings 6 and is indicated at line WS in FIG. 1. The term "semi-span" is employed to refer to the distance from the longitudinal axis x to the outermost points on either the left or right wing 6.

At any point along the span of the wings 6, a wing local chord may be defined. A local chord is defined for any given portion of an air-foil as a line between the airfoil leading and trailing edges that is in a plane which is parallel to the longitudinal axis of the aircraft. Further, the plane in which the local chord resides and that is perpendicular to the wing or winglet reference plane will be referred to herein as a chord plane.

The wing/winglet combination 10 will now be described with reference to FIGS. 2-6. Indicated at 12 is a tip of the wing 6. At a wing/winglet intersection 14, a winglet 16, which is generally trapezoidal in shape, is joined to the wing tip 12 so that the winglet 16 upwardly extends from the wing 6. A strake is indicated by reference character 16a.

The wing 12 has upper and lower wing surfaces 18 and 20, a wing leading edge 22, and a wing trailing edge 24. Similarly, the winglet 16 has upper and lower winglet surfaces 26 and 28, a winglet leading edge 30, a winglet trailing edge 32, and a winglet root 34. Conventionally, the terms "upper" and "lower" used in reference to the winglet 16 generally correspond to the "inner" and "outer" directions, respectively, defined above in relation to the aircraft 2. This convention will be followed herein.

The winglet 16 is swept back at an angle $\partial$ from the vertical z-axis at least equal to the sweep angle of the leading edges of the wings at the wingtip 14 relative to the transverse y-axis (FIG. 2). The winglet is also canted at a cant angle $\beta$ outwardly from a plane parallel to the x and y axes (FIG. 3).

The streamwise airfoil sections depicted in FIGS. 5 and 6 are of the conventional winglet 16 at the winglet root 34 and wing 12 at the wing tip 14, respectively. In this description, the term streamwise refers to the direction from the front to the back of the aircraft 2. It should be noted that the airfoil sections depicted in FIGS. 5 and 6 are normalized in the direction of the x-axis and expanded in the direction of the z-axis to illustrate more clearly the geometric features of these airfoil sections.

The winglet 16 and wing 12 are essentially advanced technology wings having generally similar streamwise airfoil sections. Specifically, the upper wing surface 18 is convex and is smoothly and aerodynamically curved, without any discontinuities thereon, from the leading edge 22 to the trailing edge 24 of the wing 12. The lower wing surface 20 of the wing 12 comprises both a convex portion 36 and a concave portion 38. The convex portion 36 is located forward on the lower surface 20 near the leading edge 22, and the concave portion 38 is located aft on the lower surface 20 near the trailing edge 24 of the wing 16. The lower surface 20 is smoothly and aerodynamically curved from the wing leading edge 22 to the wing trailing edge 24.

Similarly, the upper surface 26 of the winglet 16 is convex and smoothly curved from the winglet leading edge 30 to the winglet trailing edge 32. As with the lower wing surface 20, the lower winglet surface 28 comprises both a convex portion 40 and a concave portion 42. The lower wing surface is smoothly curved from the winglet leading edge 30 to the winglet trailing edge 32.

The determination of the curvature of these upper surfaces 18 and 26 and lower surfaces 20 and 28 are known in the art and will not be discussed further herein.

A primary feature of the airfoils depicted in FIGS. 5 and 6 is that they control shock waves generated when the fluid passing over the airfoil is decelerated to subsonic speeds. More specifically, the aircraft 2 is designed to cruise at high subsonic speeds of approximately Mach=0.81. Because the fluid flowing over the upper surface of an airfoil is accelerated to provide lift, the fluid that flows over the upper wing surface 18 and upper winglet surface 26 accelerates to transonic speeds at cruise. To reduce overall drag on the aircraft, the fluid traveling over the wing at transonic speeds should be decelerated to less than Mach=1.0 as it passes over the upper wing and winglet surfaces. The airfoils depicted in FIGS. 5 and 6 are designed to decelerate the fluid flowing thereover in predictable fashion so that the shock waves created by the deceleration of the fluid to subsonic speeds do not increase drag on the airfoil.

A relevant physical characteristic of an advanced technology airfoil as shown in FIGS. 5 and 6 and described above is that the aft portion of such an airfoil is relatively severely curved. The amount of curvature of the aft portions of the airfoils depicted in FIGS. 5 and 6 may be described in either of two ways.

A first method of defining the amount of curvature of the aft portions of the airfoils of the wing 12 and winglet 16 is to define this curvature relative as a vertical distance between the uppermost point on the upper surface to the uppermost point trailing edge downstream of this point on the upper surface. One way to calculate this vertical distance is to determine distances relative to the wing or winglet reference plane in terms of a percentage of the length of the wing or winglet local chord.

Indicated at 44 and 46 in FIGS. 5 and 6 are the local chords of the wing 12 at the wing tip 14 and the winglet 16 at the winglet root 34, respectively. These local chords 44 and 46 are each included in a chord plane associated therewith. These chord planes are perpendicular to their associated wing or winglet reference planes and coplanar with the surface of the paper on which FIGS. 5 and 6 are printed.

For the prior art wing/winglet combination 10 shown in FIGS. 2–6 under no load conditions, the wing leading edge 22 and wing trailing edge 24 lie within a wing reference plane, which is indicated at reference character 48. Similarly, in the prior art winglet 16, the winglet leading edge 30 and trailing edge 32 lie within a winglet reference plane 50 when no loads are applied. It should be noted that in some cases twist in the wing may result in the trailing edge being within ±1% of the length of the chord above or below the wing or winglet reference plane.

Reference character 52 on the wing upper surface 18 indicates what will be referred to herein as a "wing reference point". This wing reference point 52 is the point on the wing upper surface 18 that is farthest from the wing reference plane 48 and within the wing chord plane associated with the wing chord 44. In the conventional wing airfoil as depicted in FIG. 5, the wing reference point 52 lies a distance approximately equal to 5±0.5% of the wing local chord 44 above the wing reference plane 48.

Similarly, reference character 54 on the winglet upper surface 26 indicates a winglet reference point that is farthest from the winglet reference plane 50 and within the winglet chord plane associated with the winglet chord 46. In the conventional winglet airfoil depicted in FIG. 6, this winglet reference point 54 lies a distance approximately equal to 4.5±0.5% of the winglet local chord 46 above the winglet reference plane 50.

Because the wing and winglet trailing edges lie within their respective reference planes, the vertical distances between the wing and winglet reference points and the uppermost points on the wing and winglet trailing edges, which are indicated by reference characters 56 and 58 in FIGS. 5 and 6, are 5±0.5% and 4.5±0.5%, respectively. These vertical distances are relatively large and indicate the rather severe curvature of the aft portions of the upper surfaces 18 and 26.

Alternatively, the curvature of these wing and winglet upper surfaces 18 and 26 may be defined in terms of the slope of a line connecting each reference point to the uppermost portion of the trailing edge lying in the chord plane associated with these reference points. To determine these slopes, it is necessary to: (a) determine the location of a given reference point and the uppermost point on the trailing edge in the chord plane associated with the given reference point in terms of an axis x' and an axis y', where the x' and y' axes define a coordinate system in that chord plane; and (b) calculate the slope from the following slope equation:

$$m = (z'_1 - z'_2)/(x'_1 - x'_2) \tag{1}$$

where m is the slope of a line connecting a given reference point and the uppermost point on the trailing edge in the chord plane associated with that given reference point, $z'_1$ and $x'_1$ are the coordinates of the given wing reference point, and $z'_2$ and $x'_2$ are the coordinates of the uppermost point on the trailing edge in the chord plane associated with the given reference point. The sign of the slope m is negative for the right wing and winglet and positive for the left wing and winglet. The slopes of the right wings will be calculated herein, and the symbol "±" will be placed in front of the calculated slope to indicate that these numbers are applicable to both left and right wings and winglets.

In the prior art wing/winglet configuration 10, the wing reference point 52 is located a distance approximately equal to 45±5% of the wing local chord 44 aft of the wing leading edge 22. The winglet reference point is located a distance approximately equal to 45±5% of the winglet local chord 46 aft of the winglet leading edge 30.

Therefore, the slope of the line between the wing reference point 52 and the trailing edge 24 is within the range of (5±0.5-0)/(45±5-100), or between approximately ±0.07 and ±0.11. This line is indicated by reference character 60 in FIG. 5. Similarly, in terms of the winglet reference plane 50 and the length of the winglet local chord 46, the slope of the line between the winglet reference point 54 and the winglet trailing edge 32 is within the range of (5±0.5-0)/(45±0.5-100), or between approximately ±0.06 and ±0.10. This line is indicated by reference character 62 in FIG. 6.

As described above, the airfoils depicted in FIGS. 5 and 6 generally conform to well-known and accepted airfoil design principles. Under most conditions, wings conforming to airfoils designed within the ranges set forth above provide maximum lift to and minimum drag on the aircraft to which they are attached. However, when these aerodynamically efficient airfoil designs are employed at the wing/winglet intersection, flow separation occurs in a corner flow region on the upper surfaces of the wing 12 and winglet 16 at the wing/winglet intersection.

This flow separation is basically shown by arrows 64 and 66 in FIG. 3 and arrows 66 and 68 in FIG. 4. Arrows 66 and 68 in FIG. 4 generally depict the path of the fluid flowing over the forward portions of the upper wing and winglet surfaces 18 and 26, respectively. As the fluid flows towards the thickest portions of the wing 6 and winglet 16 at the wing/winglet intersection 14, the fluid 66 flowing over the wing upper surface 18 interferes with the fluid 64 flowing over the winglet upper surface 26 at the wing/winglet intersection 14. Subsequently, as the fluid flows past the thickest portions of the wing and winglet, the fluid divides into two diverging streams, which are indicated by the arrows 64 and 66 in FIG. 3.

More particularly, as it flows over these upper surfaces past this furthest point from the wing and winglet reference planes, the fluid so adheres to the wing upper surface 18 and winglet upper surface 26 that these paths 64 and 66 have components in the direction of freestream air and components which are generally perpendicular to the wing and winglet reference planes 56 and 58, respectively. Since these reference planes 56 and 58 are not parallel to each other, the components of the direction of fluid flow perpendicular thereto are in diverging directions. The area between these divergent fluid flow paths 64 and 66, which is indicated by reference character 70, is defined as a corner flow region in which flow separation occurs.

The dimensions of this area 70 vary according to the actual flight conditions, such as air speed and angle of attack of the aircraft 2, but can generally be defined as follows with reference to the wing and winglet semispan. Specifically, the corner flow region for wing/winglet configuration 10 as mounted on wing 6 is an area on the wing and winglet upper surfaces 18 and 26 that is generally bounded by lines connecting: (a) a point on the wing trailing edge 24 at approximately 97.5±1% of the wing semi-span; (b) a point on the winglet trailing edge 32 at approximately 5±2% of the winglet semi-span; and (c) the point along the wing/winglet intersection 14 which is approximately 40±10% aft of the point where the wing leading edge 22 meets the winglet leading edge 30. For any given wing/winglet configuration, the corner flow region may be determined by wind tunnel testing, computer simulation, and/or flight testing.

Many prior attempts to solve or reduce the problem of flow separation near the intersection of the wing tip and winglet have been made. Certain of these attempts are embodied in the winglet/wing tip combination described above. Specifically, the cant angle $\beta$ is provided to reduce the interference between the paths of fluid flow, which subsequently causes flow separation, at the intersection of the winglet 16 and wing tip 14. In other words, as the angle between the wing and winglet reference planes the divergence of the fluid flow paths becomes less. However, the increased cant angle $\beta$ increases the wing root bending moment contribution due to the winglet and renders the winglet sensitive to wing angle of attack variations. The strake 16a establishes a vortical flow pattern to promote attachment of the boundary layer under high speed conditions.

In addition, the length 1 and/or surface area A of the winglet 16 may be reduced to reduce flow interference at the configuration 10. However, reducing the size of the winglet adversely affects the efficiency with which the winglet causes the endplate effect on the wing and thus reduces induced drag.

These prior attempts at eliminating flow separation at the winglet/wing tip intersection have therefore been unsatisfactory because they have resulted in less than optimal winglet configurations over the entire flight envelope, generally satisfying only one flight condition.

Therefore, an overall decrease in drag can be achieved by providing the winglet 16 on the wing tip 14 as described above because of the reduction in induced drag. However, most current winglet designs still operate at reduced efficiency due to flow separation at the intersection of the winglet and wing tip.

A search of the patent literature has revealed a number of U.S. patents. These patents are noted below.

U.S Pat. No. 4,714,215. Jupp et al., discloses a winglet attached to a wing tip. The winglet is highly swept back and of low aspect ratio. This winglet/wingtip intersection provides a less than optimal configuration because the reduced size of the winglet decreases the winglets effectiveness at reducing induced drag.

U.S. Pat. No. 4,245,804, Ishimitsu et al.('804), discloses a winglet canted upwardly and outwardly from a wing tip. The leading edge of the winglet is also "toed in" towards the wing. Such a canted, toed in winglet is sensitive to wing angle of attack variations, increases the wing bending moment caused by the winglet, and thus does not provide an optimal winglet configuration over the entire flight envelope.

U.S Pat. No. 4,205 810, Ishimitsu et al.('810), discloses a winglet that is twisted relative to the direction of freestream fluid. This twisted winglet is relatively radically curved at its aft, inner surface. Ishimitsu et al.'s ('810) twisted winglet may increase flow separation under low speed, high lift conditions.

U.S. Pat. No. 2,074,201, Bechereau, discloses providing a bulge or bulges on an airfoil at a place where eddying may occur. The Bechereau patent thus does not teach a winglet, but rather a non-planar endplate of the type discussed above. The Bechereau patent thus would not be appropriate for modern high speed aircraft.

A report entitled "Design and Analysis of Winglets for Military aircraft," Boeing Commercial Airplane Company Technical Report AFFDL-TR-76-6, discusses the effects of different chordwise locations, sweep angles, taper ratios, areas, lengths, and cant angles of a twisted, cambered winglet. The different configurations studied in this test do not substantially reduce the effects of flow separation at the winglet/wingtip intersection under all flight conditions.

The following references discovered in the search appear to be no more relevant, and quite likely less relevant, than the patents noted above. Accordingly, these are listed here without discussion. U.S. Pat. No. 4,4205,810 issued 26 February 1980 to Hackett; U.S. Pat. No. 4,017,041 issued Apr. 12, 1977 to Nelson; U.S. Pat. No. 4,247,063 issued Jan. 27. 1981 to Jenkins; U.S. Pat. No. 4,240,597 issued Dec. 23, 1980 to Ellis et al.; and U.S. Pat. No. 3,845,918 issued Nov. 5, 1974 to White, Jr.

OBJECTS OF THE INVENTION

From the foregoing, it should be apparent that one important objective of the invention is to provide a novel, improved winglet/wing tip intersection configurations and methods which improve the performance of the wing and winglet.

Another important object of the present invention is to provide winglet/wing tip intersection apparatus and methods that achieve a desirable balance among the following factors:

reducing or eliminating flow separation at the wing tip;

eliminating diverging flow surfaces at the intersection of the wing tip and winglet;

reducing overall drag on the aircraft over the entire aircraft flight envelope;

minimizing the wing root bending moment;

controlling rapid leading edge flow accelerations while still maintaining advanced airfoil technology characteristics at cruise conditions;

preventing premature shock wave development;

allowing the application of wing and winglet twist and thickness distributions to satisfy desirable spanload distributions with the goal of minimizing overall induced drag;

allowing decreased airplane approach speed; and rendering the winglet less sensitive to wing angle of attack variations.

SUMMARY OF THE INVENTION

The above and other objects are achieved by the present invention, which basically comprises: (a) a wing having upper and lower wing surfaces, a wing leading edge, a wing trailing edge, and a wing tip; and (b) a winglet having upper and lower winglet surfaces, a winglet leading edge, a winglet trailing edge, and a winglet tip, where the winglet is mounted to the wing tip at a winglet/wing tip intersection and extends upwardly from the wing tip. An aft upper surface of at least one of the wing and winglet is flattened near the winglet/wing tip intersection. This flattening of the upper surface substantially reduces flow separation near wing/winglet intersection.

In the preferred form, at least one of the leading edges of the wing and winglet are so drooped near the wing/winglet intersection relative to the leading edge distal from the wing/winglet intersection that premature shock wave development is substantially reduced. Further, the winglet so extends from the wing tip that the winglet is substantially parallel to a vertical axis of an aircraft body to which the wing and winglet are attached.

The wing upper surface and upper winglet surface are flattened at least in a corner flow region in which flow separation is likely to occur. This corner flow region is an area on the wing and winglet upper surfaces bounded by lines connecting a point on the wing trailing edge at 97.5±1% of the wing semi-span, a point on the winglet trailing edge at approximately 5±2% of the winglet semi-span, and a point along the wing/winglet intersection located aft of the wing and winglet leading edges a distance approximately equal to 40±10% of a wing local chord at the wing/winglet intersection. Further, the wing and winglet upper surfaces are flattened in an area on the wing and winglet upper surfaces bounded by lines connecting a point on the wing trailing edge at 95±2% of the wing semi-span, a point on the winglet trailing edge at approximately 25±3% of the winglet semi-span, and the point along the wing/winglet intersection located aft of the wing and winglet leading edges a distance approximately equal to 40±10% of the wing local chord at the wing/winglet intersection.

In the preferred form, the chord of the wing is extended near the wing/winglet intersection to provide a desirable wing maximum thickness to wing chord ratio near the wing/winglet intersection.

Alternatively, for a wing/winglet configuration comprising: (a) a wing having upper and lower wing surfaces, a wing leading edge, a wing trailing edge, and a wing tip; and (b) a winglet having inner and outer winglet surfaces, a winglet leading edge, a winglet trailing edge, and a winglet root, where the winglet root is attached to the wing tip at a wing/winglet intersection, the present invention may be embodied in a method of increasing the performance of the wing and winglet. This method comprises the steps of: (a) defining a corner flow region on the upper wing surface and upper winglet surface near the wing/winglet intersection where flow separation is likely to occur; and (b) so flattening at least one of the upper wing surface and upper winglet surface in the corner flow region that flow separation near wing/winglet intersection is substantially reduced.

This method preferably further comprises the step of so drooping the wing and winglet leading edges near the wing/winglet intersection downward relative to the wing and winglet leading edges distal from the winglet/wing tip intersection that premature shock wave developments are substantially reduced. Further, in this method, the winglet is so attached to the wing tip that the winglet is substantially parallel to a vertical axis of an aircraft body to which the wing and winglet are attached.

The corner flow region is an area on the wing and winglet upper surfaces bounded by lines connecting a point on the wing trailing edge at 97.51% of the wing semi.span, a point on the winglet trailing edge at approximately 5±2% of the winglet semi-span, and a point along the wing/winglet intersection located aft of the wing and winglet leading edges a distance approximately equal to 40±10% of a wing local chord at the wing/winglet intersection. Additionally, the wing and winglet upper surfaces are flattened in an area on the wing and winglet upper surfaces bounded by lines connecting a point on the wing trailing edge at 95±2% of the wing semi-span, a point on the winglet trailing edge at approximately 25±3% of the winglet semi-span, and the point along the wing/winglet intersection located aft of the wing and winglet leading edges a distance approximately equal to 40±10% of the wing local chord at the wing/winglet intersection.

This method further comprises the step of so extending a local chord of the wing near the wing/winglet intersection that a desirable maximum wing thickness to wing chord ratio is obtained near the wing/winglet intersection.

The present invention may also be embodied in a wing/winglet configuration for an aircraft having a longitudinal axis, a vertical axis, and a transverse axis, comprising: (a) a wing having upper and lower wing surfaces, a wing leading edge, a wing trailing edge, and a wing tip, where (i) a wing reference plane is defined as a plane which is parallel to the longitudinal axis and which extends through the wing, and (ii) a wing local chord is defined for any given portion of the wing as a line between the wing leading edge and wing trailing edge, where the wing local chord lies in a wing chord plane which is parallel to the longitudinal axis and perpendicular to the wing reference plane; and (b) a winglet having upper and lower winglet surfaces, a winglet leading edge, a winglet trailing edge, and a winglet root, where the winglet root is attached to the wing tip at a wing/winglet intersection and (i) a winglet reference plane is defined as a plane which is parallel to the longitudinal axis and which extends through the winglet, and (ii) a winglet local chord is defined for any given portion of the winglet as a line between the winglet leading edge and winglet trailing edge, where the winglet local chord lies in a winglet chord plane which is parallel to the longitudinal axis and perpendicular to the winglet reference plane. A corner flow region is defined as the portions of the wing upper surface and upper winglet surface near the wing/winglet intersection at which flow separation may be expected to occur. For any given wing chord plane which intersects the wing upper surface in the corner flow region, a wing reference point is defined as a point on the wing upper surface that is furthest from the wing reference plane, where a vertical distance between the wing reference point and an uppermost point on the wing trailing edge farthest from the wing reference plane and in the given chord plane is less than 4.5% of the length of the wing chord associated with the given wing chord plane. Further, for any given winglet chord plane which intersects the winglet upper surface in the corner flow region, a winglet reference point is defined as a point on the winglet upper surface that is furthest from the winglet reference plane, where a vertical distance between the winglet reference point and an uppermost point on the winglet trailing edge farthest from the winglet reference plane in the given winglet chord plane is less than 4.0% of the length of the winglet chord associated with the given winglet chord plane.

In this configuration, the vertical distance between the wing reference point and the uppermost point on the wing trailing edge is greater than 0.2% and less than 1%, and is preferably between 0.3% and 0.7%, of the length of the wing chord associated with the wing chord plane at the wing tip and the vertical distance between the winglet reference point and the uppermost point on the winglet trailing edge is greater than 0.2% and less than 1%, and is preferably between 0.3% and 0.7%, of the length of the winglet chord associated with the winglet chord plane at the winglet root.

In this configuration, the wing and winglet leading edges near the wing/winglet intersection are so drooped downward relative to the wing and winglet leading edges distal from the winglet/wing tip intersection that premature shock wave development is substantially reduced.

More particularly, the wing leading edge at the wing tip is drooped between 1% and 2%, and preferably 1.5%, of the length of the wing chord at the wing tip below the wing reference plane and the winglet leading edge at the winglet root is drooped between 1% and 2%, and preferably 1.5%, of the length of the winglet chord at the winglet root below the winglet reference plane.

Also, in a wing/winglet configuration comprising: (a) a wing having upper and lower wing surfaces, a wing leading edge, a wing trailing edge, and a wing tip, where (i) a wing reference plane is defined as a plane which is parallel to the longitudinal axis and which extends through the wing, and (ii) a wing local chord is defined for any given portion of the wing as a line between the wing leading edge and wing trailing edge, where the wing local chord lies in a wing chord plane which is parallel to the longitudinal axis and perpendicular to the wing reference plane; and (b) a winglet having inner and outer winglet surfaces, a winglet leading edge, a winglet trailing edge, and a winglet root, where the winglet root is attached to the wing tip at a wing/winglet intersection and (i) a winglet reference plane is defined as a plane which is parallel to the longitudinal axis and which extends through the winglet, and (i) a winglet local chord is defined for any given portion of the winglet as a line between the winglet leading edge and winglet trailing edge, where the winglet local chord lies in a winglet chord plane which is parallel to the longitudinal axis and perpendicular to the winglet reference plane, the present invention may be embodied in a method of increasing the performance of the wing and winglet. This method comprises the steps of defining a corner flow region as the portions of the wing upper surface and upper winglet surface near the wing/winglet intersection at which flow separation may be expected to occur and (a) so flattening the upper wing surface in the corner flow region that, for any given wing chord plane which intersects the wing upper surface in the corner flow region, a wing reference point is defined as a point on the wing upper surface that is furthest from the wing reference plane, where a vertical distance between the wing reference point and an uppermost point on the wing trailing edge that is farthest from the wing reference plane and in the given chord plane is less than 4.5% of the length of the wing chord associated with the given wing chord plane, and (b) so flattening the winglet upper surface in the corner flow region that, for any given winglet chord plane which intersects the winglet upper surface in the corner flow region, a winglet reference point is defined as a point on the winglet upper surface that is furthest from the winglet reference plane, where a vertical distance between the winglet reference point and an uppermost point on the winglet trailing edge that is farthest from the winglet reference plane and in the given winglet chord plane is less than 4.0% of the length of the winglet chord associated with the given winglet chord plane.

The present invention is also embodied in a wing/winglet configuration for an aircraft having a longitudinal axis, a vertical axis, and a transverse axis, comprising: (a) a wing having upper and lower wing surfaces, a wing leading edge, a wing trailing edge, and a wing tip, where a wing reference plane is defined as a plane which is parallel to the longitudinal axis and which extends through the wing; and (b) a winglet having upper and lower winglet surfaces, a winglet leading edge, a winglet trailing edge, and a winglet root, where a winglet reference plane is defined as a plane which is parallel to the longitudinal axis and which extends through the winglet and the winglet root is attached to the wing tip at a wing/winglet intersection. In this case, a corner flow region is defined as the portion of the wing upper surface and upper winglet surface near the wing/winglet intersection at which flow separation may be expected to occur. For any given wing chord plane which intersects the wing upper surface in the corner flow region, a wing reference point is defined as a point on the wing upper surface that is furthest from the wing reference plane, where a slope of a line between the wing reference point and an uppermost point on the wing trailing edge downstream of the wing reference point is less than ±0.12. Further, for any given winglet chord plane which intersects the winglet upper surface in the corner flow region, a winglet reference point is defined as a point on the winglet upper surface that is furthest from the winglet reference plane, where a slope of a line between the winglet reference point and an uppermost point on the winglet trailing edge downstream of the winglet reference point is less than ±0.10.

In this configuration, the slope of the line between the wing reference point and the uppermost point on the wing trailing edge downstream of the wing reference point is between ±0.007 and ±0.017, and is preferably ±0.012, at the wing tip, and the slope of the line between the winglet reference point and the uppermost point on the winglet trailing edge downstream of the winglet reference point is between ±0.005 and ±015, and is preferably ±0.010, at the winglet root.

Finally, in another form the present invention is embodied in method of improving the performance of a wing/winglet configuration for an aircraft having a longitudinal axis, a vertical axis, and a transverse axis, comprising: (a) a wing having upper and lower wing surfaces, a wing leading edge, a wing trailing edge, and a wing tip, where a wing reference plane is defined as a plane which is parallel to the longitudinal axis and which extends through the wing; and (b) a winglet having upper and lower winglet surfaces, a winglet leading edge, a winglet trailing edge, and a winglet root, where a winglet reference plane is defined as a plane which is parallel to the longitudinal axis and which extends through the winglet and the winglet root is attached to the wing tip at a wing/winglet intersection. This method comprises the steps of defining a corner flow region as the portion of the wing upper surface and upper winglet surface near the wing/winglet intersection at which flow separation may be expected to occur, so flattening the wing upper surface that, for any given wing chord plane which intersects the wing upper surface in the corner flow region, a wing reference point is defined as a point on the wing upper surface that is furthest from the wing reference plane, where a slope of a line between the wing reference point and an uppermost point on the wing trailing edge downstream of the wing reference point is less than ±0.12, and so flattening the winglet upper surface that, for any given winglet chord plane which intersects the winglet upper surface in the corner flow region, a winglet reference point is defined as a point on the winglet upper surface that is furthest from the winglet reference plane, where a slope of a line between the winglet reference point and an uppermost point on the winglet trailing edge downstream of the winglet reference point is less than ±0.10.

In this method, the slope of the line between the wing reference point and the uppermost point on the wing trailing edge downstream of the wing reference point is between ±0.007 and ±0.017, and is preferably ±0.012, at the wing tip, and the slope of the line between the winglet reference point and the uppermost point on the winglet trailing edge downstream of the winglet reference point is between ±0.005 and ±0.015, and is preferably ±0.010, at the winglet root.

BRIEF DESCRIPTION OF THE DRAWING

FIG. 7 is a top plan view of the wing on which the wing/winglet configurations of the present invention are mounted;

FIG. 9 is a perspective view of the wing/winglet configuration of the present invention;

FIG. 10 is a rear plan view of the wing/winglet configuration of the present invention;

FIG. 11 is a front plan view of the wing/winglet configuration of the present invention;

FIG. 12 is a streamwise sectional view of the wing of the present invention taken at the wing tip;

FIG. 13 is a streamwise sectional view of the winglet of the present invention taken at the winglet root;

FIG. 14 is a geometric comparison of streamwise airfoil sections taken at 95±2% of the wing semi-span and 100% of the wing semi-span-span for the wing of the present invention; and FIG. 15 is a geometric comparison of streamwise airfoil sections taken at 25±3% of the winglet semi-span and 0% of the winglet semi.span for the winglet of the present invention.

DETAILED DESCRIPTION OF THE PREFERRED EMBODIMENT

Figure 1:
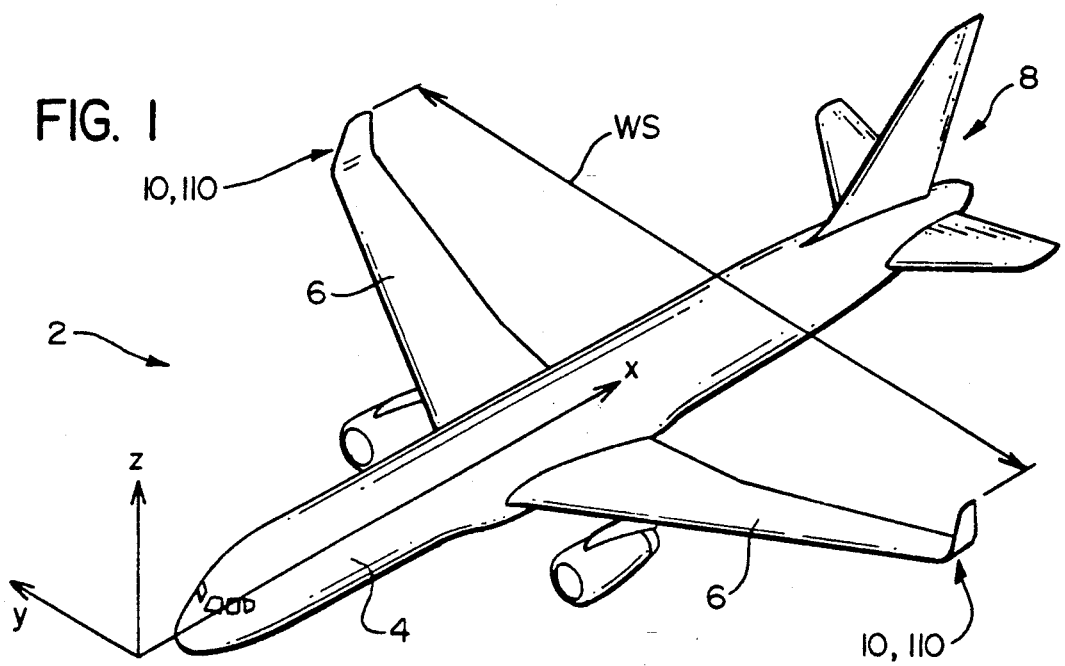
FIG. 1 is a perspective of an aircraft on which the wing/winglet configurations of the prior art and present invention may be mounted.
Figure 2:
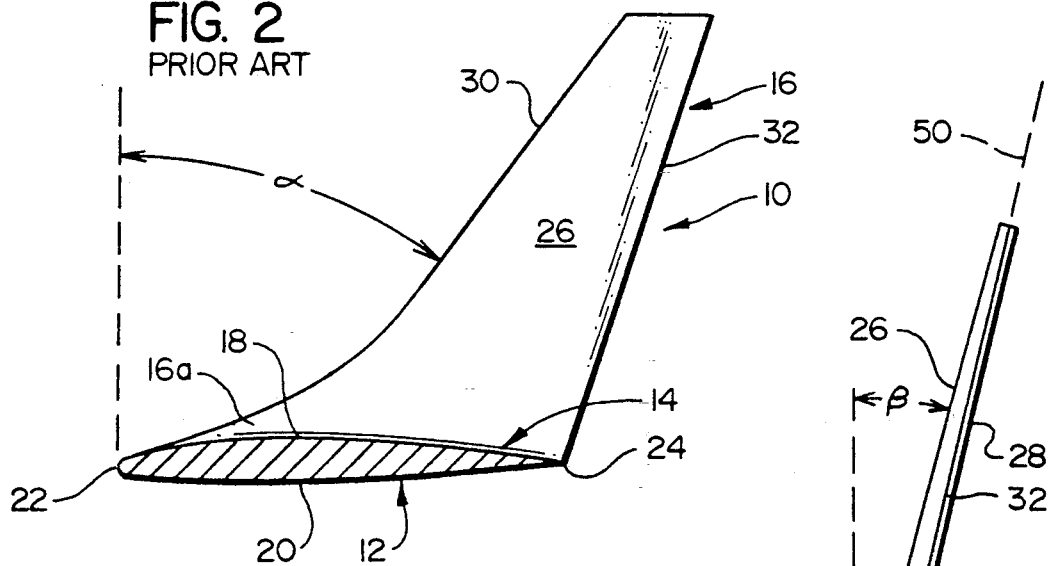
FIG. 2 is a side, cut-away view of a wing/winglet configuration as is known in the art.
Figure 8:
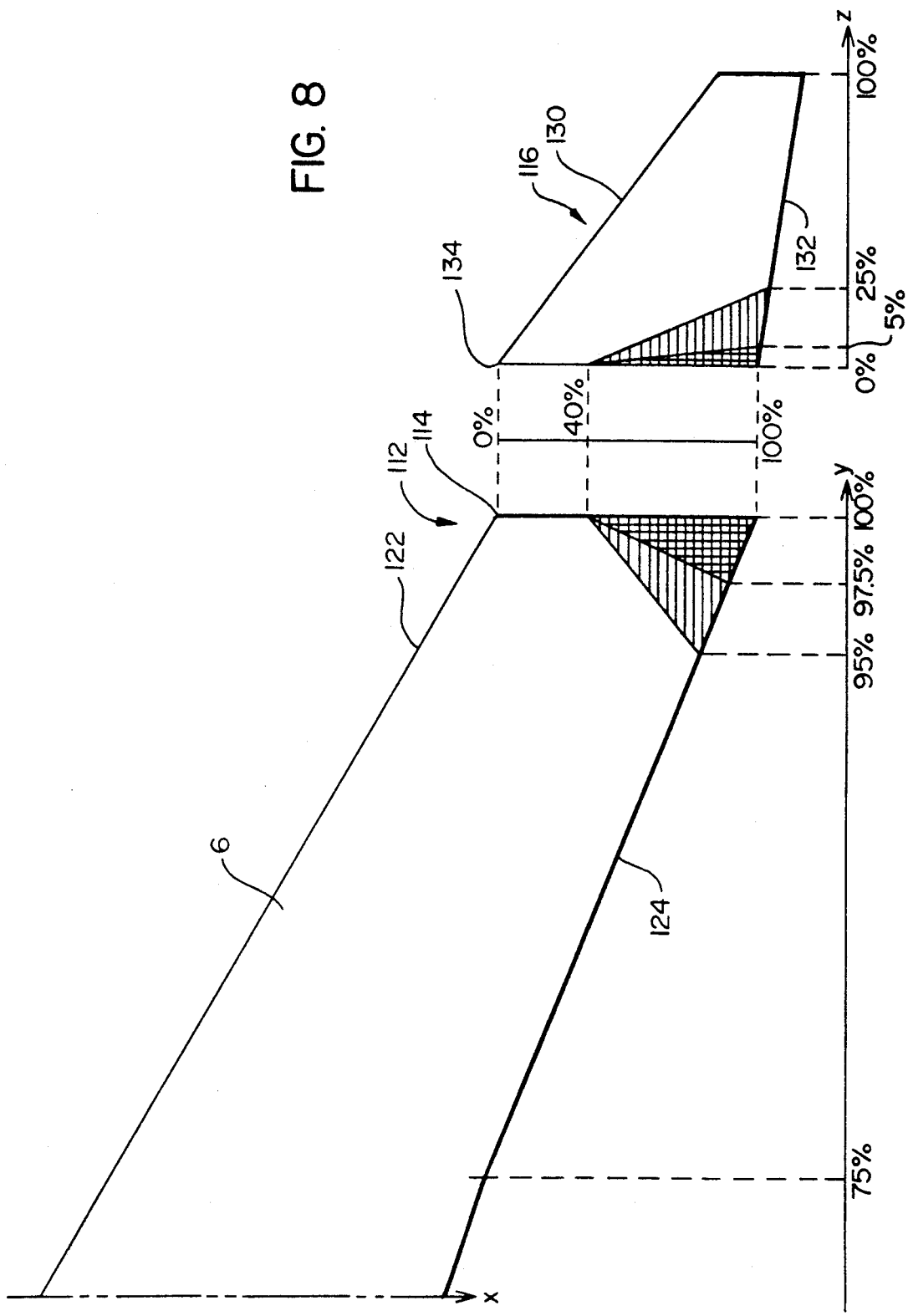
FIG. 8 is a top plan view of the wing tip and winglet showing the corner flow region in which flow separation is expected and the flattened area on the wing and winglet upper surface.

Depicted in FIGS. 7-9 is a wing/winglet configuration 110 constructed in accordance with, and embodying, the principles of the present invention. This configuration 110 is mounted on the left and right wings 6 of the aircraft 2 as shown in FIG. 1. The terminology and coordinate system described above with reference to FIG. 1 also applies to the following discussion of FIGS. 7-15.

Figure 3:
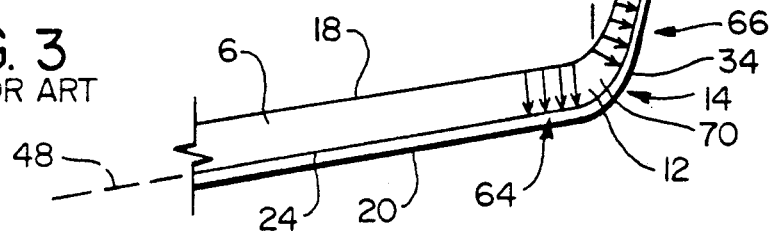
FIG. 3 is a rear plan view of the prior art wing/winglet configuration.
Figure 4:
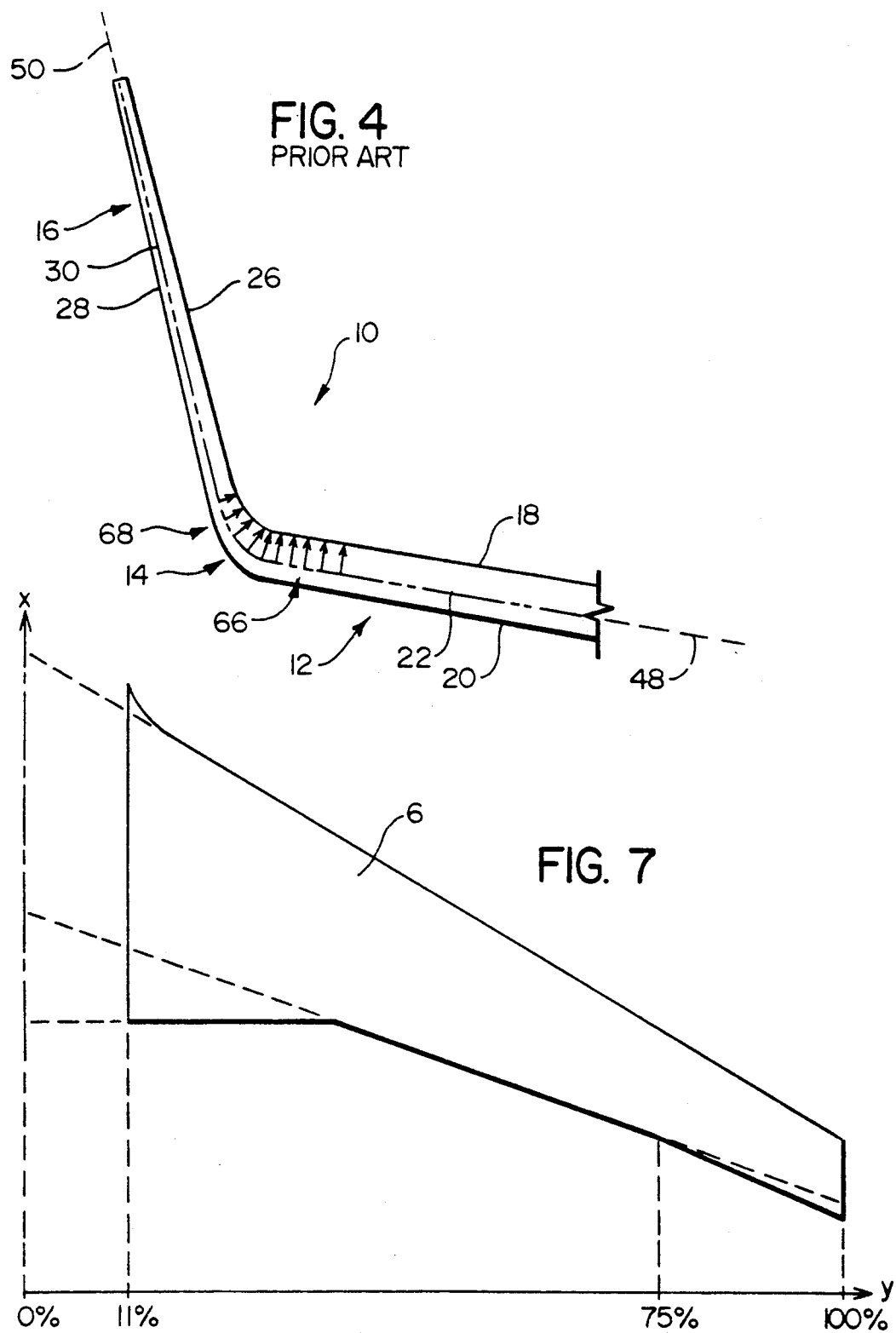
FIG. 4 is a front plan view of the prior art wing/winglet configuration.

Indicated at reference character 112 is the tip of the wing 6, and indicated at 114 is a wing/winglet intersection area of the wing/winglet configuration 110. A winglet 116, which is generally trapezoidal in shape, upwardly extends from the wing tip 112 at the wing/winglet intersection 114. The wing tip 112 has upper and lower wing surfaces 118 and 120, a wing leading edge 122, and a wing trailing edge 124. Similarly, the winglet 116 has upper and lower winglet surfaces 126 and 128, a winglet leading edge 130, a winglet trailing edge 132, and a winglet root 134. The winglet 116 is swept back at an angle ∂ at least equal to the sweep angle of the aircraft wings at the leading edge 18 of the wingtip 14 (FIG. 9). The winglet 116 is not canted outwardly in the present invention; in other words, the cant angle ∂ defined above with reference to FIG. 3 equals zero for the wing/winglet configuration 110.

Generally, the wing/winglet configuration 110 of the present invention contains three primary features. First, the aft portion of the upper wing and winglet surfaces 118 and 126 are flattened to prevent flow separation at the wing/winglet intersection 114. Second, the wing and winglet leading edges 122 and 130 are drooped downwardly to prevent premature shock wave development. Third, the winglet is not canted outwardly, so the wing bending moments are not substantially increased by the addition of the winglet 116. Each of these primary features will be discussed below in further detail. In addition to these primary features, certain secondary features of the preferred embodiment of the present invention will then be discussed.

I. Flattened Upper Surfaces

The streamwise airfoil sections depicted in FIGS. 12 and 13 and by solid lines in FIGS. 14 and 15 are of the wing 112 at the wing tip 114 and the winglet 116 at the winglet root 134, respectively. The dashed lines in FIGS. 14 and 15, on the other hand, depict the streamwise airfoil sections of the wing 112 and winglet 116 at a point distal from the wing/winglet intersection 114. As discussed above, the term "streamwise" refers to the direction from the front to the back of the aircraft 2. It should be noted that the airfoil sections depicted in FIGS. 12-15 are normalized in the direction of the x-axis and expanded in the direction of the z-axis to illustrate more clearly the primary features of the wing 112 and winglet 116.

Figure 5:
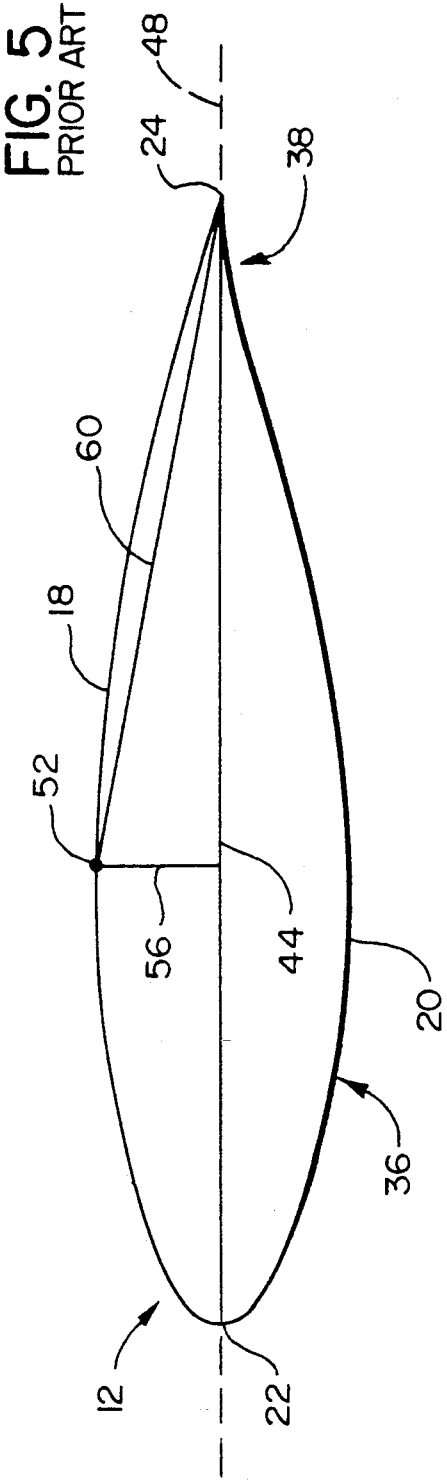
FIG. 5 is a streamwise sectional view of the prior art wing taken at the wing tip.

As shown in FIG. 12, the upper surface 118 of the wing 6 is convex. This convex upper surface 118 is aerodynamically curved from the leading edge 122 to the trailing edge 124. However, the aft portion of this upper surface 118 is relatively flat when compared with the same portion on the prior art airfoil depicted in FIG. 5. The lower surface 120 is also aerodynamically curved from the leading edge 122 to the trailing edge 124. This lower surface 120 is convex in an area indicated by reference character 136 and concave in an area indicated by reference character 138. The exact dimensions of the lower surface 120 are not relevant to the present invention and may be determined as necessary to satisfy the span-wise load distributions of the wing 6. The lower surface 120 will therefore not be discussed further below.

Figure 6:
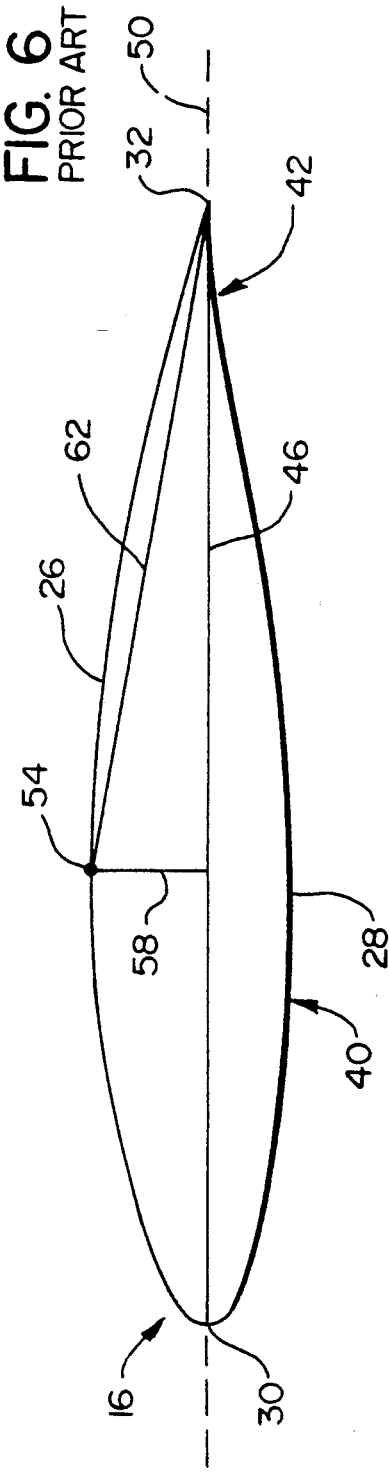
FIG. 6 is a streamwise sectional view of the prior art winglet taken at the winglet root.

As shown in FIG. 13, the upper surface 126 of the winglet 116 is also convex. This convex upper surface 126 is aerodynamically curved from the leading edge 130 to the trailing edge 132. The aft portion of this upper surface 126 is relatively flat when compared with the same portion on the prior art winglet airfoil depicted in FIG. 6. The lower surface 128 is also aerodynamically curved from the leading edge 130 to the trailing edge 132. This lower surface 128 is convex in an area indicated by reference character 140 and concave in an area indicated by reference character 142. As with the lower surface 120 of the wing 6, the exact dimensions of the lower surface 128 are not relevant to the present invention and may be determined as necessary to satisfy the span-wise load distributions of the winglet 116. The lower surface 128 will therefore not be discussed in further detail.

The flattened upper surfaces 118 and 126 are perhaps best shown by a comparison of the solid and dashed lines in FIGS. 14 and 15. According to the present invention, the upper wing surface 118 and the upper winglet surface 126 are flattened near the wing/winglet intersection 114 and the wing and winglet trailing edges 124 and 132 (solid lines) relative to the upper wing surface 118 and upper winglet surface 126 distal from the wing/winglet intersection 114 (dotted lines). This flattening substantially reduces separation of fluid flow from the upper wing surface 118 and the upper winglet surface 126 near the wing/winglet intersection 114.

The relative flatness of the aft portions of these upper wing and winglet surfaces 118 and 126 may be represented in at least two ways. First, this flatness may be measured in terms of the distance between the uppermost point on the upper surface and the uppermost point on the trailing edge down stream of that upper most point in terms of a percentage of the length of the local chord of that chord plane.

Specifically, a wing reference point 152 is defined as a point that is farthest from the wing chord 144 and within the chord plane associated with the wing chord 144. When no loads are applied to the wing/winglet configuration 110, the wing reference point 152 at the wing tip 112 is located a distance of approximately 5.0% of the wing local chord 144 above the wing reference plane 148. In addition, the uppermost point of the wing trailing edge 124 is located approximately 4.4% of the wing local chord 144 above the wing reference plane 148. Thus, the vertical distance, which is indicated by line 156 in FIG. 12, between the wing reference point 152 and wing trailing edge 124 is approximately 0.6% of the wing local chord. In any event, this vertical distance 156 should be greater than 0.2% and less than 1.0%, and preferably between 0.3% and 0.7%, of the wing local chord 144 at the wing tip 114.

Similarly, a winglet reference point 154 is defined as a point that is farthest from the winglet chord 146 and within the chord plane associated with the winglet chord 146. Under no load conditions, the winglet reference point 154 at the winglet root 134 is located a distance of approximately 3.8% of the winglet local chord 146 above the winglet reference plane 150. In addition, the uppermost point of the winglet trailing edge 132 is located approximately 3.2% of the winglet local chord 146 above the winglet reference plane 150. Thus, the vertical distance, which is indicated at reference character 158 in FIG. 13, between the winglet reference point 154 and winglet trailing edge 132 is approximately 0.6% of the wing local chord. In most cases, this vertical distance 158 is greater than 0.2% and less than 1.0%, and preferably between 0.3% and 0.7%, of the winglet local chord 146 at the winglet root 134.

These vertical distances 156 and 158 are much smaller than those distances 56 and 58 described above for the prior art wing/winglet configuration 10, indicating that the aft portions of the upper wing surface 118 and upper winglet surface 126 are significantly flatter than those of the prior art upper surfaces 18 and 26.

A second method of quantifying the flattening of the upper surfaces 118 and 126 is by calculating the slope of the line connecting the wing and winglet reference points 152 and 154 with the uppermost portions of the wing and winglet trailing edges 124 and 132 that lie in the chord plane associated with the local chords 144 and 146, respectively. The uppermost portion of the wing or winglet trailing edge in the chord plane associated with these chords may also be referred to as the uppermost point on the wing trailing edge downstream, or to the aft, of the corresponding reference point.

These slopes as defined above generally correspond to the amount of vertical drop of these upper surfaces; that is, the smaller the slope, the flatter the upper surface.

In the preferred embodiment, the wing reference point 152 is located aft of the wing leading edge 122 a distance approximately equal to 52.5% of the wing local chord 144. Accordingly, employing the slope equation (1) set forth above, the slope of the line connecting the wing reference point 152 with the uppermost point of the wing trailing edge 124 at the wing tip 112 is $(5.0-4.4)/(52.5-100)$, or approximately $\pm 0.012$. This line is indicated at reference character 160 in FIG. 12. However, a slope between $\pm 0.007$ and $\pm 0.027$ at the wing tip 112 is within the scope of the present invention.

The winglet reference point 154 is located aft of the winglet leading edge 130 a distance approximately equal to 40% of the winglet local chord 146. The slope of the line connecting the winglet reference point 154 with the uppermost point of the winglet trailing edge 132 at the winglet root 134 is therefore $(3.8-3.2)/(40-100)$, or approximately $\pm 0.010$. This line is indicated at 162 in FIG. 13. A slope between $\pm 0.005$ and $\pm 0.015$ at the winglet root 134 is within the scope of the present invention, however.

The slopes of these lines 160 and 162 are much smaller than the slopes of the comparable lines 60 and 62 calculated for the prior art wing/winglet configuration 10, illustrating that the upper surfaces 118 and 126 of the present invention are quite flat in comparison to the upper surfaces 18 and 26 of the prior art configuration 10.

The flattening of the wing and winglet upper surfaces 118 and 120 is most severe at the wing tip 112 and winglet root 134. However, these upper surfaces of the wing 6 and winglet 116 are gradually flattened towards the wing/winglet intersection 114. More particularly, as shown in FIGS. 7 and 8, the wing 6 may be referenced to the semi-span of the aircraft 2. According to this reference system, the wing 6 is attached to the aircraft at approximately 11% of the aircraft semi-span. Further, in the preferred embodiment, starting at approximately 75% semi-span the chord of the wing 6 is extended to obtain a favorable maximum wing thickness to wing chord ratio. This chord extension will be explained in further detail below in the discussion of the secondary features of the present invention.

Referring now to FIG. 8, a flattened area in which the wing upper surface 118 and winglet upper surface 126 are flattened is indicated by lines parallel to the y-axis on the wing and the z-axis on the winglet. As shown, this flattened area includes the area on the wing and winglet upper surfaces 118 and 126 that is generally bounded by lines connecting: (a) a point on the wing trailing edge 24 at approximately $95 \pm 2\%$ of the wing semi-span; (b) a point on the winglet trailing edge 32 at approximately $25 \pm 3\%$ of the winglet semi-span; and (c) the point along the wing/winglet intersection which is approximately $40 \pm 10\%$ aft of the point where the wing leading edge 22 meets the winglet leading edge 30.

The corner flow region in which flow separation is likely to occur is indicated by lines parallel to the x-axis. This corner flow region is determined for a particular wing/winglet configuration by wind tunnel testing, flight testing, and/or computer simulation. For the preferred embodiment, this region is the same as the corner flow region defined above for prior art apparatus 10. Specifically, the corner flow region is the area on the wing and winglet upper surfaces 118 and 126 that is generally bounded by lines connecting: (a) a point on the wing trailing edge 24 at approximately $97.5 \pm 1\%$ of the wing semi-span; (b) a point on the winglet trailing edge 32 at approximately $5 \pm 2\%$ of the winglet semi-span; and (c) the point along the wing/winglet intersection which is approximately $40 \pm 10\%$ aft of the point where the wing leading edge 22 meets the winglet leading edge 30.

As can be seen from FIG. 8, the wing and winglet upper surfaces 118 and 126 are flattened at least inside of the corner flow region. In the preferred embodiment, the upper surfaces 118 and 126 are also flattened outside the corner flow region to allow the upper surfaces 118 and 126 to be gradually flattened from points outside the corner flow region to the wing tip 114 and winglet root 134 where the flattening is the greatest. This gradual flattening provides for an aerodynamically smooth transition to the point of maximum flattening without any discontinuities on the upper surfaces 118 and 126.

This gradual flattening may be described in terms of the vertical distance between a given wing reference point and the uppermost point on the wing trailing edge associated with that given wing reference point. This vertical distance is approximately 5.3% of the wing local chord at $95 \pm 2\%$ semi-span and gradually decreases to 0.6% of the wing local chord at the wing tip 114, or at 100% semi-span.

Similarly, the gradual flattening of the winglet upper surface 126 may be described in terms of the vertical distance between a given winglet reference point and the uppermost point on the winglet trailing edge associated therewith. For the preferred embodiment, this vertical distance is approximately 4.6% of the winglet local chord at 25±3% semi-span and gradually decreases to 0.6% of the winglet local chord at the winglet root 134, or at 0% semi-span.

In the FIGS. 14 and 15, the suffix "a" indicates the wing or winglet at 95±2% wing semi-span and 25±3% winglet semi-span, respectively.

In general, for any chord plane which intersects the wing upper surface 118 within the corner flow region, this vertical distance should be at least less than 5.0% of the wing local chord associated with that chord plane. Similarly, for any winglet chord plane which intersects the winglet upper surface 126 within the corner flow region, the vertical distance should be at least less than 4.0% of the winglet local chord associated with that winglet chord plane.

Alternatively, this gradual flattening may be described in terms of the slope of the line connecting a wing reference point to the closest point on the wing trailing edge in the chord plane associated therewith. In the wing/winglet configuration 110 of the preferred embodiment, this slope gradually decreases from approximately ±0.1 at 95±2% of the wing semi-span to approximately ±0.012 at 100% of the wing semi-span. For the winglet 116, the slope gradually decreases from approximately ±0.7 at 25±3% of the winglet semi-span to approximately ±0.010 at 0% of the winglet semi-span.

Generally, then, for any chord plane which intersects the wing upper surface 118 within the corner flow region, the slope should be less than approximately ±0.12. Similarly, for any winglet chord plane which intersects the winglet upper surface 126 within the corner flow region, the slope should be less than approximately ±0.10.

Therefore, the wing and winglet upper surfaces 118 and 126 are gradually flattened from a point outside the corner flow region to the wing/winglet intersection, where the flattening is the greatest.

It has been found that, with the upper surfaces 118 and 126 of the wing 6 and the winglet 116 flattened as described above near the wing/winglet intersection 114, flow separation is virtually eliminated over all flight conditions. With the wing/winglet configuration 110 designed according to the present invention, the fluid passing over the upper surfaces of the airfoils does not diverge at as it passes over the thickest point of the airfoil. Accordingly, the present invention prevents flow separation from occurring near the wing/winglet intersection.

II. Drooped Leading Edges

A second major feature of the present invention is that the leading edges 122 and 130 of the wing 6 and winglet 116 are drooped downwardly near the wing/winglet intersection to eliminate or at least substantially reduce premature shock wave development. It has been found that the flattened upper surfaces 118 and 126 allow rapid flow accelerations at cruise conditions. These rapid flow accelerations could lead to premature shock wave development, resulting in increased drag and ultimately flow separation on the winglet.

More particularly, the leading edges 122 and 130 are drooped near the wing/winglet intersection relative to that leading edge distal from the wing/winglet intersection. The amount that these leading edges 122 and 130 are drooped may be quantified relative to the wing reference plane. As shown by the dotted line in FIG. 14, the leading edge 122a of the airfoil at 95±2% semi-span lies within the wing reference plane. In contrast, the leading edge 122 of the airfoil at the wing tip 114 (i.e., 100% semi-span) is drooped below the wing reference plane 148 a distance of between ±1% and ±2%, and preferably ±1.5%, of the wing local chord 144 at the wing tip 114. Similarly, as shown by the dotted line in FIG. 15, the leading edge 130a of the winglet airfoil at 25±3% semi-span lies within the winglet reference plane 150. The leading edge 130 of the winglet airfoil at the winglet root 134 (i.e., 0% semi-span), on the other hand, is drooped below the winglet reference plane 150 a distance of between 0.5% and 1.5%, and preferably 1.0%, of the winglet local chord 146 at the winglet root 134.

As with the flattening of the wing and winglet upper surfaces 118 and 126, the wing and winglet leading edges 122 and 130 are gradually drooped. More particularly, the drooping of the wing leading edge 122 of the preferred embodiment begins at approximately 95±2% of the wing semi-span and gradually increases to a maximum value at 100% of the wing semi-span. Similarly, the drooping of the winglet leading edge 130 begins at approximately 25±3% of the winglet semi-span and gradually increases to a maximum value at 0% of the winglet semi-span.

Drooping the leading edge at the wing/winglet intersection as described above prevents the premature development of shock waves, which would otherwise result in increased drag and ultimately flow separation on the winglet. III. Winglet Not Outwardly Canted As mentioned above, the winglet 116 is not outwardly canted. More specifically, the winglet 116 is vertically aligned such that the winglet reference plane 150 is substantially parallel to the plane formed by the x-axis and the y-axis. Because the flow separation at the wing/winglet intersection 114 is eliminated by the flattening of the aft portions of the upper wing and winglet surfaces 118 and 126, outward canting of the winglet 116 to prevent flow separation is not necessary.

The vertically aligned winglet 116 minimizes the bending moment at the root of the wing 6. Further, this vertical winglet 116 is less sensitive to wing angle of attack variations than is an outwardly canted winglet such as the winglet 16 of the prior art wing/winglet configuration 10.

IV. Secondary Features

Other important but secondary features of the present invention are as follows.

First, as shown in FIG. 7, the length of the chord of the wing 6 is increased beginning at approximately 75% of the wing semi-span. This lengthening of the wing chord is necessary to decrease the wing thickness to wing chord ratio at the wing trailing edge near the wing/winglet intersection. Due to the flattening of the upper surface 118, the wing trailing edge 124 would otherwise be too thick relative to the length of the wing chord 144 at the wing tip 112. The lengthening of the wing chord near the wing/wingtip intersection 114 yields a wing thickness to chord ratio of just under 12% at the wing tip 112.

Second, the winglet 116 is joined to the wing tip 112 so that the juncture between the upper wing surface 118 and upper winglet surface 126 is smooth and continuous at the wing/winglet intersection 114.

Similarly, the wing lower surface 120 and winglet lower surface 128 are smoothly and continuously joined by a curved surface 160 at the bottom of the wing/winglet intersection 114. The exact shape of this curved surface 160 is not relevant to the present invention and can be designed as necessary to satisfy load distributions at the wing/winglet intersection.

Third, the upper wing and winglet surfaces, lower wing and winglet surfaces, and bottom curved surface at the wing/winglet intersection for any given wing/winglet configuration should be so aerodynamically curved that the pressure distributions on the wing tip 112 and winglet 116 satisfy the requirements of cruise performance. Given the geometric parameters set forth above, a satisfactory design of these surfaces may easily and quickly be determined by one of ordinary skill in the art to obtain the appropriate pressure distributions under cruise conditions for any given wing/winglet configuration. Accordingly, the design of these surfaces will not been discussed herein in further detail.

Fourth, in the present invention as shown in FIG. 9, the wing leading edge 12 and winglet leading edge 130 are coextensive at the wing/winglet intersection 14. The winglet 116 thus presents a larger surface area for preventing transverse fluid flow over the wing tip 112.

V. Summary

The wing/winglet configuration 110 embodying the features present invention described above has been found to improve overall performance of the wing to which it is attached. Specifically, during wind tunnel testing, drag polars of a wing/winglet configuration having a geometry substantially as described above were as follows.

At Mach=0.70 and CL's below 0.3, the drag level of the wing was increased. However, at Mach=0.70, the drag polars clearly showed that at values of CL above 0.3 the winglets became more effective and significantly reduced the drag. At Mach=0.80 and 0.81, large drag reductions were also shown at CL =0.55 and higher.

In addition to the drag benefits of the winglets, the CLmax capability of the wing was improved. This is a significant result because such winglets usually degrade the CLmax capability of the wing due to flow separation at the wing/winglet intersection.

In summary, the results of the wind tunnel testing show that the present invention as embodied in the wing/winglet configuration 110 are very effective at increasing overall wing and winglet performance.

From the foregoing, it should be clear that the present invention may be embodied in forms other than the one disclosed above without departing from the spirit or essential characteristics of the invention. For example, the wing/winglet configuration of the preferred embodiment incorporates all of the above-described primary features. A wing/winglet configuration embodying one or more of these primary features may effectively improve the overall performance of the wing, but will not be as effective as the wing/winglet configuration of the preferred embodiment described above in which all of these primary features are combined.

The above-described embodiment is therefore to be considered in all respects illustrative and not restrictive, the scope of the invention being indicated by the appended claims rather than the foregoing description. All changes that come within the meaning and scope of the claims are intended to be embraced therein.

We claim:

1. A wing/winglet configuration for an aircraft having a longitudinal axis, a vertical axis, and a transverse axis, comprising:
   a. a wing having upper and lower wing surfaces, a wing leading edge, a wing trailing edge, and a wing tip, where a wing chord may be defined for any given portion of the wing which extends between the wing leading and trailing edges; and
   b. a winglet leading and trailing edges; and surfaces, a winglet leading edge, a winglet trailing edge, and a winglet root, where
      i. a winglet chord is defined for any given portion of the winglet, the winglet chord extending between the winglet leading and trailing edges, and
      ii. the winglet root is attached to the wing tip at a wing/winglet intersection; wherein
   c. a corner flow region is defined as the portions of the wing upper surface and winglet upper surface near the wing/winglet intersection at which flow separation is likely to occur;
   d. first and second reference planes are defined for the wing and winglet, respectively, where
      i. the first reference plane extends through the wing leading and trailing edges just outside the corner flow region, and
      ii the second reference plane extends through the winglet leading and trailing edges just outside the corner flow region;
   e. wing and winglet chord planes may be defined for any given wing chord and any given winglet chord, respectively, where
      i. the wing chord plane is parallel to the longitudinal axis and perpendicular to the first reference plane, and
      ii. the winglet chord phase is parallel to the longitudinal axis and perpendicular to the second reference plane; and
   f. for any given chord plane which intersects the wing upper surface in the corner flow region, a wing reference point is defined as a point on the wing upper surface that is furthest from the first reference plane, where a vertical distance between the wing reference point and an uppermost point on the wing trailing edge furthest from the first reference plane and in the given wing chord plane is less than 4.5% of the length of the wing chord associated with the given wing chord plane.

2. A configuration as recited in claim 1, in which:
   a. the corner flow region is an area on the wing and winglet upper surfaces bounded by lines connecting a point on the wing trailing edge at 97.5±1% of the wing semi-span, a point on the winglet trailing edge at approximately 5±2% of the winglet semi-span, and a point along the wing/winglet intersection located aft of the wing and winglet leading edges a distance approximately equal to 40±10% of a wing local chord at the wing/winglet intersection; and
   b. the wing and winglet upper surfaces are flattened in an area on the wing and winglet upper surfaces bounded by lines connecting a point on the wing trailing edge at 95±2% of the wing semi-span, a point on the winglet trailing edge at approximately 25±3% of the winglet semi-span, and the point along the wing/winglet intersection located aft of the wing and winglet leading edges a distance approximately equal to 40±10% of the wing local chord at the wing/winglet intersection.

3. A wing/winglet configuration as recited in claim 1, in which a local chord of the wing is extended near the wing/winglet intersection to obtain a desirable maximum wing thickness to wing chord ratio near the wing/winglet intersection.

4. A wing/winglet configuration as recited in claim 1, where for any given winglet chord plane which intersects the winglet upper surface near the wing/winglet intersection, a winglet reference point is defined as a point on the winglet upper surface that is furthest from the second reference plane, where a vertical distance between the winglet reference point and an uppermost point on the winglet trailing edge furthest from the second reference plane and in a given winglet chord plane is less than 4.0% of the length of the winglet chord associated with the given winglet chord plane.

5. A configuration as recited in claim 4, in which the winglet extends from the wing tip that the winglet is substantially parallel to the vertical axis of the aircraft.

6. A configuration as recited in claim 4, in which:
   a. the vertical distance between the wing reference point and the uppermost point on the wing trailing edge is greater than 0.2% and less than 1% of the length of the wing chord associated with the wing chord plane at the wing tip; and
   b. the vertical distance between the winglet reference point and the uppermost point on the winglet trailing edge is greater than 0.2% and less than 1% of the length of the winglet chord associated with the winglet chord plane at the winglet root.

7. A configuration as recited in claim 4, in which the wing and winglet leading edges near the wing/winglet intersection are drooped downward relative to the wing and winglet leading edges distal from the winglet/wing tip intersection such that premature shock wave development is substantially reduced.

8. A configuration as recited in claim 7, in which:
   a. the wing leading edge at the wing tip is drooped between 1% and 2%, of the length of the wing chord at the wing tip below the first reference plane; and
   b. the winglet leading edge at the winglet root is drooped between 0.5% and 1.5% of the length of the winglet chord at the winglet root below the second reference plane.

9. A configuration as recited in claim 4, in which the winglet extends from the wing tip such that the winglet is substantially parallel to a vertical axis of an aircraft body to which the wing and winglet are attached.

10. A configuration as recited in claim 4, in which:
    a. the corner flow region is an area on the wing and winglet upper surfaces bounded by lines connecting a point on the wing trailing edge at 97.5±1% of the wing semi-span, a point on the winglet trailing edge at approximately 5±2% of the winglet semi-span, and a point along the wing/winglet intersection located aft of the wing and winglet leading edges a distance approximately equal to 40±10% of a wing local chord at the wing/winglet intersection; and
    b. the wing and winglet upper surfaces are flattened in an area on the wing and winglet upper surfaces bounded by lines connecting a point on the wing trailing edge at 95±2% of the wing semi-span, a point on the winglet trailing edge at approximately 25±3% of the winglet semi. span, and the point along the wing/winglet intersection located aft of the wing and winglet leading edges a distance approximately equal to 40±10% of the wing local chord at the wing/winglet intersection.

11. A configuration as recited in claim 4, in which the chord of the wing is extended near the wing/winglet intersection to provide a wing maximum thickness to wing chord ratio near the wing/winglet intersection of less than 12%.

12. In an aircraft having a longitudinal axis, a vertical axis, a transverse axis, and a wing/winglet configuration comprising:
    a. a wing having upper and lower wing surfaces, a wing leading edge, a wing trailing edge, and a wing tip, where a wing chord is defined for any given portion of the wing which extends between the wing leading and trailing edges; and
    b. a winglet having upper and lower winglet surfaces, a winglet leading edge, a winglet trailing edge, and winglet root, where
       i. a winglet chord is defined for any given portion of the winglet, the winglet chord extending between the winglet leading and trailing edges, and
       ii. the winglet root is attached to the wing tip at a wing/winglet intersection;
    a method of increasing the performance of the wing and winglet comprising the steps of:
    c. defining a corner flow region as the portions of the wing upper surface and winglet upper surface near the wing/winglet intersection at which flow separation is likely to occur;
    d. defining first and second reference planes for the wing and winglet, respectively, where
       i. the first reference plane extends through the wing leading and trailing edges just outside the corner flow region, and
       ii. the second reference plane extends through the winglet leading and trailing edges just outside the corner flow region;
    e. defining wing and winglet chord planes for any given wing chord and any given winglet chord, respectively, where
       i. the wing chord plane is parallel to the longitudinal axis and perpendicular to the first reference plane, and
       ii. the winglet chord phase is parallel to the longitudinal axis and perpendicular to the second reference plane; and
    f. flattening the upper surface in the corner flow region such that for any given wing chord plane which intersects the wing upper surface in the corner flow region, a wing reference point is defined as a point on the wing upper surface that is furthest from the first reference plane, and a vertical distance between the wing reference point and an uppermost point on the wing trailing edge furthest from the first reference plane and in the given wing chord plane is less than 4.5% of the length of the wing chord associated with the given wing chord plane.

13. A method as recited in claim 12, further comprising the step of flattening the winglet upper surface in the corner flow region such that, for any given winglet chord plane which intersects the winglet upper surface near the wing/winglet intersection, a winglet reference point is defined as a point on the winglet upper surface that is furthest from the second reference plane, and a vertical distance between the winglet reference point and an uppermost point on the winglet trailing edge furthest from the second reference plane and in the given winglet chord plane is less than 4.0% of the length of the winglet chord associated with the given winglet chord plane.

14. A method as recited in claim 13, further comprising the step of attaching the winglet to the wing tip such that the winglet is substantially parallel to a vertical axis of an aircraft body to which the wing and winglet are attached.

15. A method as recited in claim 13, in which:
 a. the corner flow region is an area on the wing and winglet upper surfaces bounded by lines connecting a point on the wing trailing edge at 97.5±1% of the wing semi-span, a point on the winglet trailing edge at approximately 5±2% of the winglet semi. span, and a point along the wing/winglet intersection located aft of the wing and winglet leading edges a distance approximately equal to 40±10% of a wing local chord at the wing/winglet intersection; and
 b. the wing and winglet upper surfaces are flattened in an area on the wing and winglet upper surfaces bounded by lines connecting a point on the wing trailing edge at 95±2% of the wing semi-span, a point on the winglet trailing edge at approximately 25±3% of the winglet semi-span, and the point along the wing/winglet intersection located aft of the wing and approximately equal to 40±10% of the wing local chord at the wing/winglet intersection.

16. A method as recited in claim 13, further comprising the step of extending a local chord of the wing near the wing/winglet intersection such that a desirable maximum wing thickness to wing chord ratio is obtained near the wing/winglet intersection.

17. A method as recited in claim 13, in which:
 a. the vertical distance between the wing reference point and the uppermost point on the wing trailing edge is greater than 0.2% and less than 1% of the length of the wing chord associated with the wing chord plane at the wing tip; and
 b. the vertical distance between the winglet reference point and the uppermost point on the winglet trailing edge is greater than 0.2% and less than 1% of the length of the winglet chord associated with the winglet chord plane at the winglet root.

18. A wing/winglet configuration for an aircraft having a longitudinal axis, a vertical axis, and a transverse axis, comprising:
 a. a wing having upper and lower wing surfaces, a wing leading edge, a wing trailing edge, and a wing tip; and
 b. a winglet having upper and lower winglet surfaces a winglet leading edge, a winglet trailing edge, and a winglet root, where
  i. a winglet chord is defined for any given portion of the winglet which extends between the winglet leading and trailing edges, and
  ii. the winglet root is attached to the wing tip at a wing/winglet intersection; wherein
 c. a corner flow region is defined as the portions of the wing upper surface and winglet upper surface near the wing/winglet intersection at which flow separation is likely to occur;
 d. a reference plane is defined for the winglet, where the reference plane extends through the winglet leading and trailing edges just outside the corner flow region;
 e. a winglet chord plane is defined for any given winglet chord, where the winglet chord plane is parallel to the longitudinal axis and perpendicular to the reference plane; and
 f. for any given chord plane which intersects the wing upper surface in the corner flow region, a winglet reference point is defined as a point on the winglet upper surface that is furthest from the reference plane, where a vertical distance between the winglet reference point and an uppermost point on the winglet trailing edge furthest from the reference plane and in the given winglet chord plane is less than 4.0% of the length of the winglet chord associated with the given winglet chord plane.

19. IN an aircraft having a longitudinal axis, a vertical axis, a transverse axis, and a wing/winglet configuration comprising:
 a. a wing having upper and lower wing surfaces, a wing leading edge, a wing trailing edge, and a wing tip, where a wing chord is defined for any given portion of the wing which extends through the wing leading and trailing edges; and
 b. a winglet having upper and lower winglet surfaces, a winglet leading edge, a winglet trailing edge, and a winglet root, where
  i. a winglet chord is defined for any given portion of the winglet, the winglet chord extending between the winglet leading and trailing edges, and
  ii. the winglet root is attached to the wing tip at a wing/winglet intersection; wherein
 a method of increasing the performance of the wing and winglet comprising the steps of:
 c. a corner flow region is defined as the portions of the wing upper surface and winglet upper surface near the wing/winglet intersection at which flow separation is likely to occur;
 d. defining a reference plane for the winglet, where the reference plane extends through the winglet leading and trailing edges just outside the corner flow region;
 e. defining a winglet chord plane for any given winglet chord, where the winglet chord plane is parallel to the longitudinal axis and perpendicular to the reference plane; and
 f. flattening the upper winglet surface in the corner flow region such that for any given winglet chord plane which intersects the winglet upper surface in the corner flow region, a winglet reference point is defined as a point on the winglet upper surface that is furthest from the reference plane, and a vertical distance between the winglet reference point and an uppermost point on the winglet trailing edge furthest from the reference plane and in the given winglet chord plane is less than 4.0% of the length of the winglet chord associated with the given winglet chord plane.

* * * * *